Oct. 28, 1924.
F. M. VAN GELDEREN
1,513,656
INSULATING CAP FOR ELECTRICAL CABLE JOINTS
Filed April 27, 1923
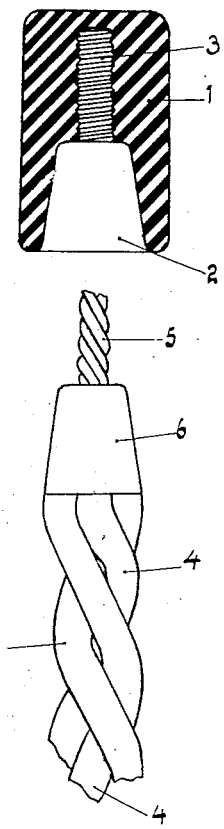
Inventor:
Frederik Marinus van Gelderen
by Byrnes, Townsend & Brickenstein
Attorneys.

Patented Oct. 28, 1924.

1,513,656

UNITED STATES PATENT OFFICE.

FREDERIK MARINUS van GELDEREN, OF ENSCHEDE, NETHERLANDS.

INSULATING CAP FOR ELECTRICAL-CABLE JOINTS.

Application filed April 27, 1923. Serial No. 635,107.

*To all whom it may concern:*

Be it known that I, FREDERIK MARINUS VAN GELDEREN, a subject of the Queen of the Netherlands, residing at Enschede, in the Province of Overijsel, in the Kingdom of the Netherlands, have invented Improved Insulating Caps for Electrical-Cable Joints, of which the following is a specification.

For the protection of the end joints or ligatures of electric conductors, use is made of insulating sockets or capsules of galalith, ebonite or an organic compound of this kind, provided with a single conical opening followed by a narrow cylindrical passage which is connected to the conical opening and in which is fixed a metal wire wound in the form of a helix, so that the internal wall of the passage forms a screw thread. The capsule can be screwed on to the ends of the wires after they have been stripped and twisted around one another. The metal wire which forms the screw thread is then attached firmly on to the ends of the conductors and at the same time the internal wall of the conical opening is drawn rigidly against the insulating covering of the line wires and forms therewith a hermetic seal. This arrangement has various defects. In the first place the materials cited above are hardly suitable for the connecting capsules, as they soften at high temperatures. If moisture penetrates into the junction box, the socket gradually absorbs this moisture and in this case likewise it loses its resistance as the current can pass through the moist material and thus cause a leakage. In the second place the manufacture and the mounting of the metal helix constitute supplementary operations which render the manufacture of the capsule more costly. The metal has also to be protected in some way or other from oxidation.

Insulating capsules of porcelain are likewise, known, which can be placed over the end joints and afterwards filled with cement or a composition run in. In order that these capsules may be the better fixed to the assembled ends of cables, they are provided internally with grooves of circular form or a coarse screw thread while the inner edge is made conical.

The present invention consists of a suitable combination of the advantageous properties possessed by the two groups of connecting sockets above described whereby the disadvantageous properties are done away with.

According to this invention the capsule or socket is constructed entirely of a single material, which is harder than the metal of which the electrical conductors are made or the metal by means of which the conductors are soldered, and which possesses however insulating properties so far as electricity and moisture are concerned, for example of glass, porcelain and ceramic materials of this kind, and this capsule is provided with a conical opening which extends towards the interior tapering as it goes and terminates in a cylindrical internally screw threaded passage, the internal diameter of this passage being smaller than the external diameter of the twisted conductors which the capsule is intended to cap, the whole being arranged so that the capsule can be turned like a nut on the twisted conductors the internal screw thread then creating, by forcing back the metal, a screw thread on the conductors while the conical internal part of the capsule is pressed hermetically against the insulating covering of the line wires.

A connecting capsule for electrical conductors is also known consisting of a small sheath of malleable copper which is placed on the stripped ends of the conductors and which is then pressed on to the conductors by means of a special pair of pliers the jaws of which create a screw thread on the outside surface of the sheath. On to this screw thread is fitted an insulating capsule and the connection is then finished. It will be understood at once that this known device is more costly than that which forms the subject matter of the present invention in which copper is not used while furthermore the old arrangement requires the use of a pair of pliers of a special kind for the creation of the screw thread. With the device according to the present invention the use of tools is entirely superfluous because the capsules can be easily screwed by hand on to the twisted ends of the conductors.

The invention will now be described below more in detail with reference to the accompanying drawing.

The capsule or socket 1 which in the case shown is supposed to be of porcelain but which may also be made of any other material possessing the necessary properties, has on the side of the open end a part 2 which extends and tapers as it extends towards the interior and is prolonged by a narrow cylindrical passage 3 in which a screw thread is formed when it is manufactured.

The electrical conductors 4, which are, for example, wires of 1.5 sq. mm. insulated with rubber, are twisted together in the usual way after the copper wires have been stripped for a fixed length corresponding to the length of the passage 3.

When the capsule is turned on the twisted wires, these penetrate into the screw thread and at the same time they are pressed against each other so that they are brought into mutual intimate contact.

As the material of the capsule is harder than that of the conductors, the capsule cuts a screw thread in the external surface of the stripped conductors. At the same time the insulation of rubber or other similar material is applied firmly to the conical opening in the capsule. The end joint of the conductors so stripped is thus enclosed and completely insulated.

If necessary the stripped ends 5 may be previously soldered. This does not prevent the capsule from being screwed on, because the screw threads leave sufficient space to receive the material run in.

The manufacture of the capsule may be carried in a single operation in a suitable machine by means of a staff without any special experience, so that if account be taken also of the low price of the material used, the cost price of the capsule manufactured in quantities is extremely small. The putting of the capsule in place presents no difficulty to the workman.

When it is necessary or prescribed the part 6 of the insulating covering may if necessary be coated with Chatterton composition or an equivalent material, before screwing it on.

What I claim is:

1. A one-piece insulating cap for the bared ends of electrical conductors, said cap comprising non-conducting and non-hygroscopic material having a conical recess into which the insulation of the conductors is adapted to wedge as the cap is threaded upon the bared ends, and a threaded bore extending inwardly from said recess, the material of said cap being harder than the conductors, whereby the threads of said bore will cut their own threads upon said conductors as the cap is turned upon the same.

2. Insulating capsule for end joints of electric conductors made entirely of a single material which is harder than the metal of the joint, and possessing at the same time insulating properties as far as electricity and moisture are concerned, said capsule being provided with a conical opening extending and contracting as it does so towards the interior and terminating in a cylindrical passage screw-threaded internally, of smaller internal diameter than the external diameter of the joined conductors which the capsule is intended to cap, the whole being of such a nature that the capsule can be screwed like a nut on to the conductors, the internal screw thread then creating a screw thread by forcing back the surface metal of the joint while at the same time the conical internal part of the capsule is pressed hermetically against the insulating covering of the conductors.

In testimony whereof I affix my signature.

FREDERIK MARINUS van GELDEREN.